US006687567B2

(12) United States Patent
Watanabe

(10) Patent No.: US 6,687,567 B2
(45) Date of Patent: Feb. 3, 2004

(54) POWER TOOLS

(75) Inventor: Masahiro Watanabe, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/358,539

(22) Filed: Feb. 5, 2003

(65) Prior Publication Data

US 2003/0149508 A1 Aug. 7, 2003

(30) Foreign Application Priority Data

Feb. 7, 2002 (JP) ....................................... 2002-031170

(51) Int. Cl.[7] .......................... G06F 19/00; B25B 21/02

(52) U.S. Cl. ........................... 700/168; 700/117; 173/2; 173/11; 173/176

(58) Field of Search ............................ 700/90, 95, 117, 700/159, 168; 173/2, 90, 11, 4, 176; 702/33

(56) References Cited

U.S. PATENT DOCUMENTS

| | | | | | |
|---|---|---|---|---|---|
| 4,313,505 | A | * | 2/1982 | Silvern | 173/93.5 |
| 5,199,505 | A | * | 4/1993 | Izumisawa | 173/93.6 |
| 5,277,261 | A | | 1/1994 | Sakoh | 173/176 |
| 5,289,885 | A | | 3/1994 | Sakoh | 173/2 |
| 6,598,684 | B2 | | 7/2003 | Watanabe | 173/2 |
| 6,607,041 | B2 | | 8/2003 | Suzuki et al. | 173/4 |

FOREIGN PATENT DOCUMENTS

| | | |
|---|---|---|
| JP | 7-314344 | 12/1995 |
| JP | 10-180643 | 7/1998 |
| JP | 2000-210877 | 8/2000 |

* cited by examiner

*Primary Examiner*—Jayprakash N. Gandhi
(74) *Attorney, Agent, or Firm*—Orrick Herrington & Sutcliff LLP

(57) ABSTRACT

Power tool (1) may include a drive source (22). A device for generating an elevated torque, such as a hammer (4) and anvil (2), may be operably coupled to the drive source. Further, a trigger switch (48) may energize the drive source. Preferably, a sensor (30) detects when the hammer has begun to strike the anvil and generate the elevated torque. A control device (38) communicates with the sensor, the trigger switch and the drive source. Preferably, the control device may control the drive source according to either a measurement mode or an automatic stop mode. In the measurement mode, the control device preferably activates the drive source when the trigger switch is switched from the OFF position to the ON position, and stop the drive source when the trigger switch is switched from the ON position to the OFF position. Further, the control device preferably measures a time period from when a first impact is detected by the sensor to when the trigger switch is switched from the ON position to the OFF position. In the automatic stop mode, the control device preferably activates the drive source when the trigger switch is switched from the OFF position to the ON position, and stops the drive source when a predetermined or preset time has elapsed after a first impact was detected by the sensor.

14 Claims, 6 Drawing Sheets

POWER TOOLS

This application claims priority to Japanese patent application number 2002-31170, the contents of which are hereby incorporated by reference.

BACKGROUND OF THE INVENTION

1. Field of the Invention

The present invention relates to power tools and more particularly, relates to power tools, such as impact wrenches and impact screwdrivers.

2. Description of the Related Art

Japanese Laid-open Patent Publication No. 7-314344 describes an impact wrench that can be used to firmly tighten fasteners, such as a bolt or a nut. In this type of impact power tool, the tightening torque applied to the fastener may be determined based upon the number of times and the frequency at which the hammer impacts or strikes an anvil. In a known technique, a sensor is utilized to detect impacts between the hammer and anvil. When the number of the impacts by the hammer on the anvil reaches a predetermined number, a motor stops rotating the hammer. Thus, an appropriate amount of torque is applied to the fastener by stopping the tightening operation when the predetermined number of impacts has been reached.

In the alternative, the motor can be automatically stopped after a predetermined time interval or period has elapsed after the detection of the first impact of the hammer striking the anvil. Therefore, an appropriate amount of torque is applied to the fastener.

SUMMARY OF THE INVENTION

However, if the predetermined number of impacts or the predetermined interval of time is too high, the tightening torque applied to the fastener will be too great and may damage the fastener. On the other hand, if the predetermined number of impacts or the predetermined interval of time is too low, the tightening torque applied to the fastener will be insufficient. Thus, it is necessary to determine an appropriate number of impacts or interval of time.

The appropriate number of impacts or interval of time varies according to the task to be undertaken due to, e.g., the diameter of the fastener and the material of the workpiece. A reliable method for determining the appropriate number of impacts or interval of time for each different task has not yet been developed. Therefore, an operator has to determine the appropriate number of impacts or interval of time by trial and error. For example, the operator may tentatively set an estimated proper value, undertake the task (tighten the fastener) using the value, and, upon completion of the task, measure the tightening torque in order to determine whether the estimated proper value is appropriate. The operator may then repeat this series of actions in order to find the appropriate number of impacts or interval of time. Therefore, determining an appropriate number of impacts or interval of time requires much time and effort.

It is, accordingly, an object of the present teachings to provide an improved power tool that can save the time and the effort required to determine an appropriate number of impacts or interval of time.

In one aspect of the present teaching, impact power tools may include a hammer that is allowed to slip and rotate freely with respect to an anvil when a force exceeding a predetermined magnitude is applied between the hammer and anvil. Preferably, the hammer may impact or strike the anvil after the hammer has slipped or rotated by a predetermined angle. The impact then causes the anvil to rotate by a small amount and tighten the fastener. Such impact power tools may also include a trigger switch for energizing a drive source, such as an electric or pneumatic motor, and a control device, such as a microprocessor or microcomputer, for controlling the drive source. Preferably, the control device may activate the drive source when the trigger switch is switched to the ON position, and stop the drive source when the trigger switch is switched to the OFF position. Additionally, the control device may measure the number of impacts during the time period from when the trigger switch is switched to the ON position to when the trigger switch is switched to the OFF position. In the alternative, the control device may measure the time period from a first impact to when the trigger switch is switched to the OFF position.

Therefore, an operator skilled at tightening fasteners operates the power tool and, the control device measures the number of impacts or the time period. Generally speaking, a skilled operator is capable of tightening fasteners with an appropriate tightening torque regardless of the task being undertaken. Thus, the measured number of impacts or the time period, is an appropriate number of impacts or interval of time, for stopping the drive source. Accordingly, a novice can utilize the measured number of impacts or the time period in order to apply an appropriate tightening torque to the fastener. This enables even an unskilled operator to reduce the time and effort required to determine the appropriate number of impacts or interval of time for stopping the drive source.

Optionally, a sensor may be provided to detect the impacts between the hammer and anvil. The sensor may communicate detected impacts to the control device and the control device may preferably utilize information concerning the detected impacts in order to control the operation of the drive source. If an oil pulse unit is utilized to generate elevated torque, instead of a hammer and anvil, the sensor may sense some characteristic (e.g., emitted sound) of the oil pulse unit that indicates the oil pulse unit is generating oil pulses. Again, this information may then be communicated to the control device and utilized according to the steps described above and below.

The type of sensor that can be utilized with the present teachings is not particularly limited and may be any type of sensor capable of detecting impacts between the hammer and anvil. For example, the present teachings contemplate the use of accelerometers, which detect the acceleration of the hammer, proximity sensors, which detect the position of the hammer, and/or sound sensors (e.g., condenser microphones, piezoelectric materials, etc.), which detect impact sounds generated by the hammer striking the anvil (or oil pulses generated by an oil pulse unit).

In one embodiment of the present teachings, a display device, such as an indicator or display device (e.g., LED display, LCD display, etc.), may be provided to indicate the measured number of impacts or the time period. The display device may be illuminated or otherwise actuated when the trigger switch is switched from the ON position to the OFF position. Thus, the operator may know the measured number of impacts or the time period.

These aspects and features may be utilized singularly or, in combination, in order to make improved power tools, including but not limited to, impact wrenches and impact screwdrivers. In addition, other objects, features and advantages of the present teachings will be readily understood after reading the following detailed description together with the accompanying drawings and claims. Of course, the additional features and aspects disclosed herein also may be utilized singularly or, in combination with the above-described aspects and features.

DETAILED DESCRIPTION OF THE INVENTION

Figure 1:
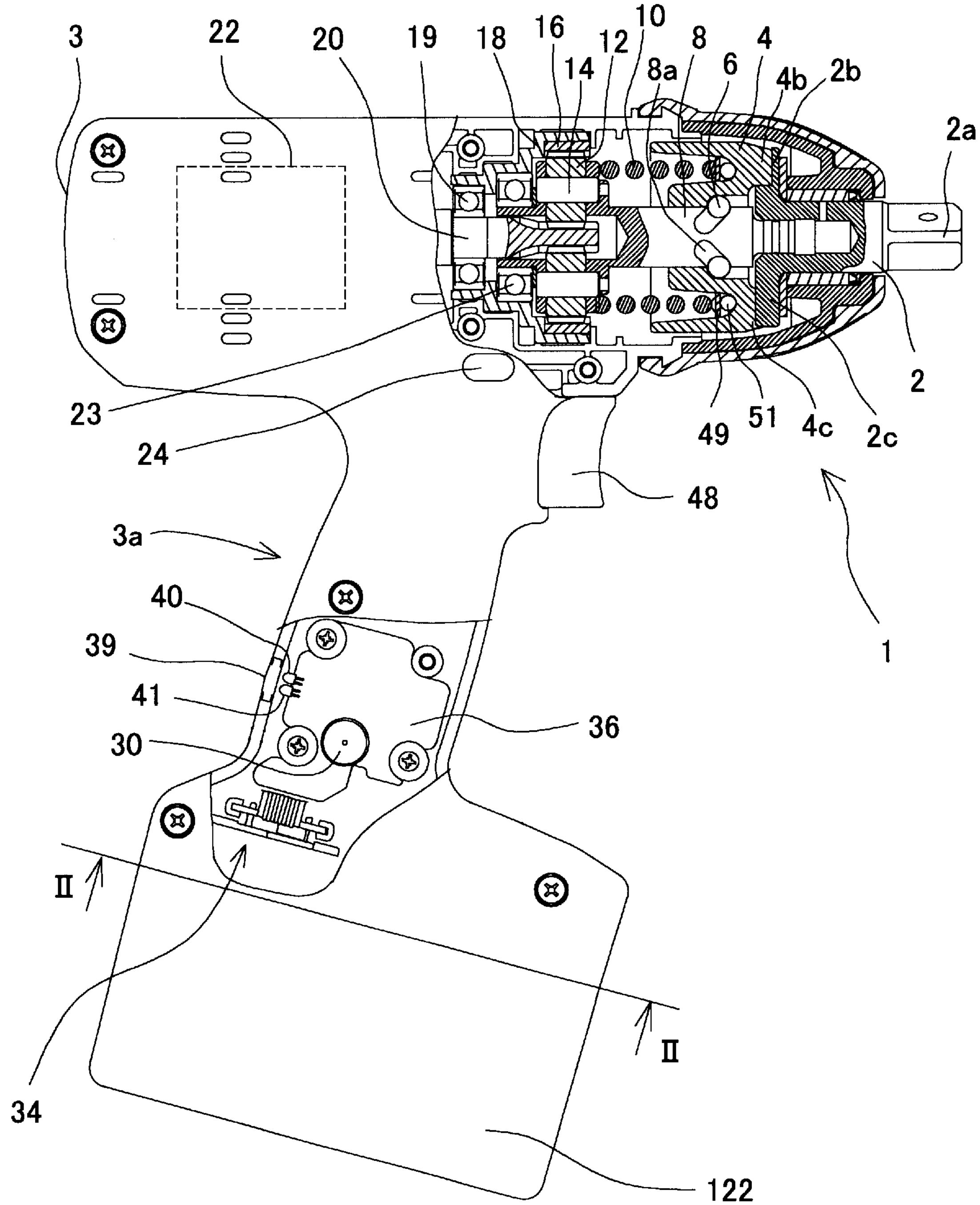
FIG. 1 is a side view, with parts broken away, of a power tool of the representative embodiment.

In one embodiment of the present teachings, power tools may preferably include a drive source, such as a motor. The power tool may include means for generating an elevated torque operably coupled to the drive source, which may include a hammer and anvil or may include an oil pulse unit. Further, the power tool may include a trigger switch that energizes the drive source. A sensor preferably detects when the means for generating an elevated torque has begun to operate and generate the elevated torque. A wide variety of sensors may be utilized for this purpose.

A control device, such as microprocessor or microcomputer, preferably communicates with the sensor, the trigger switch and the drive source. For example, the control device may control the drive source according to either a measurement mode or an automatic stop mode. In the measurement mode, the control device preferably activates the drive source when the trigger switch is switched from the OFF position to the ON position, and stops the drive source when the trigger switch is switched from the ON position to the OFF position. Further, the control device preferably measures a time period from when a first impact is detected by the sensor to when the trigger switch is switched from the ON position to the OFF position. In the automatic stop mode, the control device preferably activates the drive source when the trigger switch is switched from the OFF position to the ON position, and stops the drive source when a predetermined or preset time has elapsed after the first impact was detected by the sensor.

In another embodiment of the present teachings, in the measurement mode, the control device preferably activates the drive source when the trigger switch is switched from the OFF position to the ON position, and stops the drive source when the trigger switch is switched from the ON position to the OFF position. Further, the control device may preferably count the number of impacts detected by the sensor from when the trigger switch is switched from the OFF position to the ON position to when the trigger switch is switched from the ON position to the OFF position. In the automatic stop mode, the control device may activate the drive source when the trigger switch is switched from the OFF position to the ON position, and stop the drive source when the number of impacts detected by the sensor has reached a predetermined or preset number.

In another embodiment of the present teachings, the control device may start a timer when the control device determines that the means for generating an elevated torque has begun to operate and generate an elevated torque after the fastener has reached a seated position against the workpiece. Thereafter, the control device preferably stops the timer when the trigger switch is switched from the ON position to the OFF position. Further, the control device preferably re-sets the timer to zero when the control device determines that the means for generating an elevated torque has begun to operate before the fastener has reached the seated position against the workpiece.

In another embodiment of the present teachings, the control device may start a counter to count the number of signals generated by the sensor after the fastener has reached the seated position. Thereafter, the control device preferably stops the timer when the trigger switch is switched from the ON position to the OFF position. In addition, the control device may preferably re-sets the counter to zero when the control device determines that the means for generating an elevated torque has begun to operate before the fastener has reached the seated position against the workpiece.

In another embodiment of the present teachings, power tools may further include a means for setting a value that is converted to the time period for stopping the drive source in the automatic stop mode. Such setting means may be, e.g., dial switches (or dial selectors), or a remote control device (e.g., a device that communicates instruction to the control device by radio waves, infrared waves or other wavelengths).

In another embodiment of the present teachings, the power tool may further include a first means for indicating the time period measured in the measurement mode. Such first indicating means may be an indicator or display device. The first indicating means may be connected to the control device. The control device may preferably actuate the first indicating means when the switch is switched from the ON position to the OFF position in the measurement mode. Preferably, the first indicating means may indicate the measured time period such that the measured time period is converted to a setting value that can be set on the setting means.

In another embodiment of the present teachings, the control device may further control the speed of rotation of the drive source according to the amount that the trigger switch has been pulled. Further, the power tool may include a second means for indicating that the time period measured in the measurement mode is inaccurate. The second indicating means may be connected to the control device. In the measurement mode, the control device may actuate the second indicating means if the time period is measured when the amount that the trigger switch has been pulled is improper.

In another embodiment of the present teachings, the control device may measure the driving speed of the drive source in the measurement mode. If the power tool is set to the automatic stop mode, the control device may control the drive source based upon the drive time or the number of impacts and the driving speed of the device source, all of which were measured in the measurement mode. For example, in the measurement mode, the control device preferably measures the driving speed of the drive source until the trigger switch is switched to the OFF position. In the alternative, the control device may measure the degree to which the driving speed changes with time. On the other hands, in the automatic stop mode, the control device preferably controls the drive source at the driving speed, which was measured in the measurement mode, regardless of the amount that the trigger switch has been pulled. Alternatively, the control device may control the drive source according to the degree to which driving speed changes with time.

In another embodiment of the present teachings, power tools may further include a means for switching from the automatic stop mode to the measurement mode. Such switching means may be, e.g., dial switches (or dial selectors) or a remote control device.

Each of the additional features and method steps disclosed above and below may be utilized separately or in conjunction with other features and method steps to provide improved power tools and methods for making and using the same. Detailed representative examples of the present teachings, (such examples will be described below), utilize many of these additional features and method steps in conjunction. However, this detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the present teachings in the broadest sense, and are instead taught merely to particularly describe representative and preferred embodiments of the present teachings, which will be explained below in further detail with reference to the figures. Of course, features and steps described in this specification and in the dependent claims may be combined in ways that are not specifically enumerated in order to obtain other usual and novel embodiments of the present teachings. The present inventors have contemplated such additional combinations.

Detailed Representative Embodiment

FIG. 1 shows a detailed representative embodiment of the present teachings. For example, impact wrench 1 may include motor 22 that is disposed within housing 3. Gear 19 is disposed on output shaft 20, which is coupled to motor 22. Gear 19 engages a plurality of planet gears 12 that are rotatably mounted on pin 14. Internal gear 16 is disposed within internal gear case 18 and engages planet gears 12. The gears may reduce the driving speed of a tool bit (not shown). Further, pin 14 may be fixedly attached to a spindle 8, which is rotatably mounted within housing 3.

Spindle 8 may be rotatably driven by motor 22 using a reduction gear mechanism, which may comprise gears 12, 16, and hammer 4 is rotatably mounted on the spindle 8. A cam mechanism having a plurality of recesses 8*a* and bearings 6, which bearings 6 are disposed within recesses 8*a,* is interposed between hammer 4 and spindle 8. Recesses 8*a* are formed within spindle 8 in a V-shape and thus extend obliquely relative to the longitudinal axis of spindle 8. The cam mechanism permits hammer 4 to move by a predetermined distance along spindle 8 in the longitudinal direction. Compression spring 10 is interposed between hammer 4 and spindle 8 via bearing 51 and washer 49 so as to normally bias hammer 4 in the rightward direction of FIG. 1.

Anvil 2 is rotatably mounted on the forward end of housing 3 and cooperates with hammer 4 to generate a tightening torque. Forward portion 2*a* of anvil 2 may have a polygonal cross-section that is adapted to mount the tool bit (not shown). The tool bit may then engage the fastener in order to drive the fastener into the workpiece. The rear end of anvil 2 preferably has two protrusions 2*b,* 2*c* that radially extend from anvil 2. The forward portion of hammer 4 also preferably has two protrusions 4*b,* 4*c* that radially extend from hammer 4. Protrusions 2*b,* 2*c* and protrusions 4*b,* 4*c* are adapted to abut each other.

When the fastener is tightened using a relatively low torque, the force transmitted from protrusions 4*b,* 4*c* to protrusions 2*b,* 2*c,* as well as the force applied to hammer 4 by spindle 8 via bearings 6, is relatively small. Thus, hammer 4 continuously contacts anvil 2 due to the biasing force of spring 10. Because the rotation of spindle 8 is continuously transmitted to anvil 2 via hammer 4, the fastener is continuously tightened.

However, when the tightening torque becomes larger, the force transmitted from protrusions 4*b,* 4*c* to protrusions 2*b,* 2*c,* as well as the force applied to hammer 4 by spindle 8 via bearings 6, becomes larger. Thus, a force that urges hammer 4 rearward along spindle 8 becomes larger. When the force applied to anvil 2 by hammer 4 exceeds a predetermined force (i.e. a threshold force), hammer 4 moves rearward and protrusions 4*b,* 4*c* disengage from protrusions 2*b,* 2*c.* Therefore, hammer 4 will rotate idly relative to anvil 2 (i.e. no force is transmitted from hammer 4 to anvil 2 for a portion of the rotation). However, as protrusions 4*b,* 4*c* pass over protrusions 2*b,* 2*c,* hammer 4 moves forward due the biasing force of the spring 10. As a result, hammer 4 strikes or impacts anvil 2 after each rotation at a predetermined angle. By changing the operation of the tightening tool so that hammer 4 repeatedly strikes anvil 2, the torque applied to the fastener increases as the number of impacts increases.

Next, the switches and other parts installed in handle portion 3*a* will be explained with reference to FIGS. 1 to 3. Specifically, FIG. 2 shows a view looking into the handle from the direction indicated by line II in FIG. 1 (i.e., from the bottom of the impact wrench 1), after battery pack 122 has been removed from impact wrench 1.

As shown in FIG. 1, main switch 48 for starting motor 22 and motor rotation direction switch 24 for switching the direction of rotation of motor 22 are installed on handle 3*a.* Main switch 48 is preferably a trigger switch. In addition, setting device 34 is installed on the bottom of handle 3*a.* Setting device 34 may include, e.g., first setting dial 33 and second setting dial 35, as shown in FIG. 2. FIG. 3 shows an enlarged view of dial section 34, in which first setting dial 33 and the second setting dial 35 are disposed within dial section 34. A scale of numerals 0 through 9 and a scale of letters A through F may be provided on first setting dial 33. Further, a scale of numerals 0 through 9 may be provided on second setting dial 35. In this representative embodiment, it is possible to set a time period after which motor 22 will be stopped, if an impact (i.e., hammer 4 striking anvil 2) is detected. This period of time can be set using setting dials 33 and 35. For example, the time period may be selected using the numerical value "X" set using first dial 33 and the numerical value "Y" set using second dial 35.

As a more specific representative example, when a numerical value "X" is set using first setting dial 33 and a numerical value "Y" is set using second setting dial 35, the time period T may be determined, e.g., by the equation: $[(X\times10)+Y]+0.02$ seconds. On the other hand, if first setting dial 33 and second setting dial 35 are both set to "0," the measurement mode will be selected and motor 22 will be continuously driven as long as main switch 48 is switched to the ON position.

Figure 2:
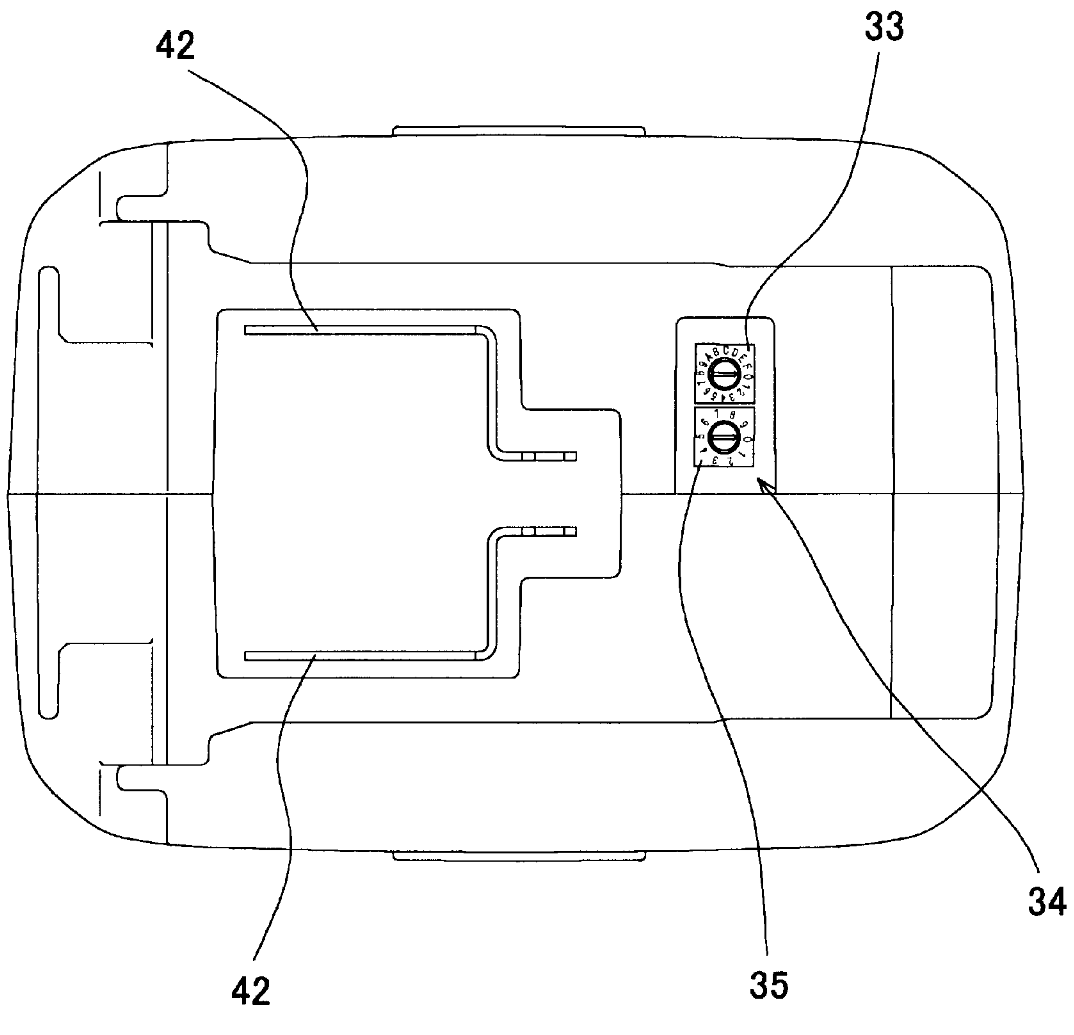
FIG. 2 shows a view looking into a battery mounting portion of the power tool of the representative embodiment after the battery pack has been removed (view looking from the direction of line II shown in FIG. 1).
Figure 3:
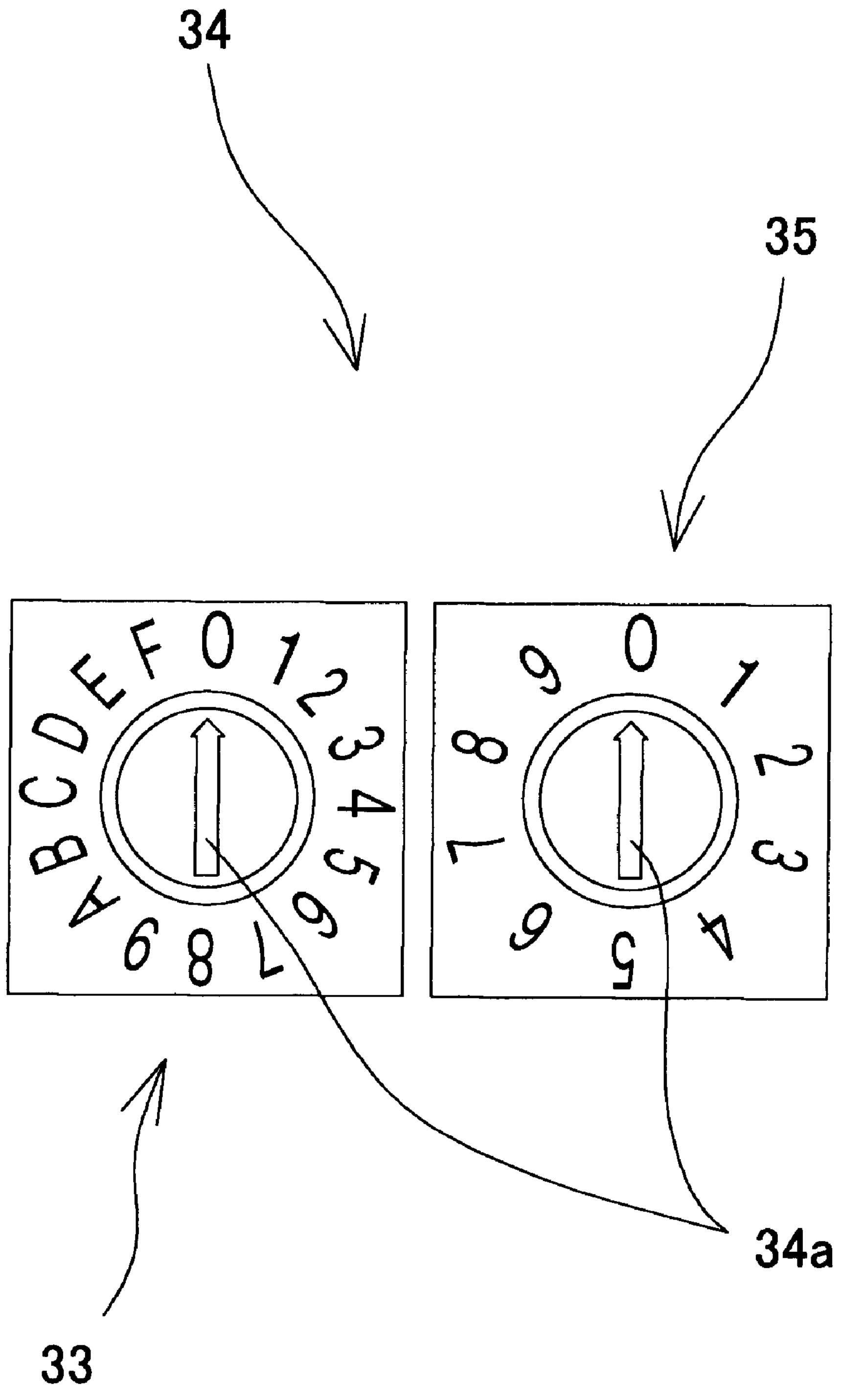
FIG. 3 is an enlarged view of the setting dial of FIG. 2.

As indicated by FIGS. 1 and 2, the settings of each dial 33 and 35 can be changed only when battery pack 122 is removed from handle portion 3*a,* which will prevent accidental changes in the values set on the dials 33 and 35. In addition, as shown in FIG. 2, contact element 42 is disposed on the bottom of handle portion 3*a* so that contact element 42 will contact the corresponding electrical contact (not shown) of battery pack 122.

Further, control substrate 36 may be mounted within the bottom of handle portion 3*a,* as shown in FIG. 1. Microcomputer 38, switching circuit 114 and other electronic parts can be mounted on control substrate 36. Control substrate 36 may be, e.g., a printed circuit board. Sound receiver 30 (e.g., a piezoelectric buzzer) that is capable of detecting impact sounds generated when hammer 4 strikes anvil 2 also can be mounted on control substrate 36. Control substrate 36 may include red light emitting diode (LED) 40 and a green LED 41. The rear of handle 3*a* has window 39. Light is emitted from red LED 40 or green LED 41 through window 39 in order to indicate to, e.g., a person controlling the operation a measurement result obtained in the measurement mode. In addition, detachable battery pack 122 for supplying power to motor 22, microcomputer 38, etc is attached to the bottom of handle 3*a*.

Figure 4:
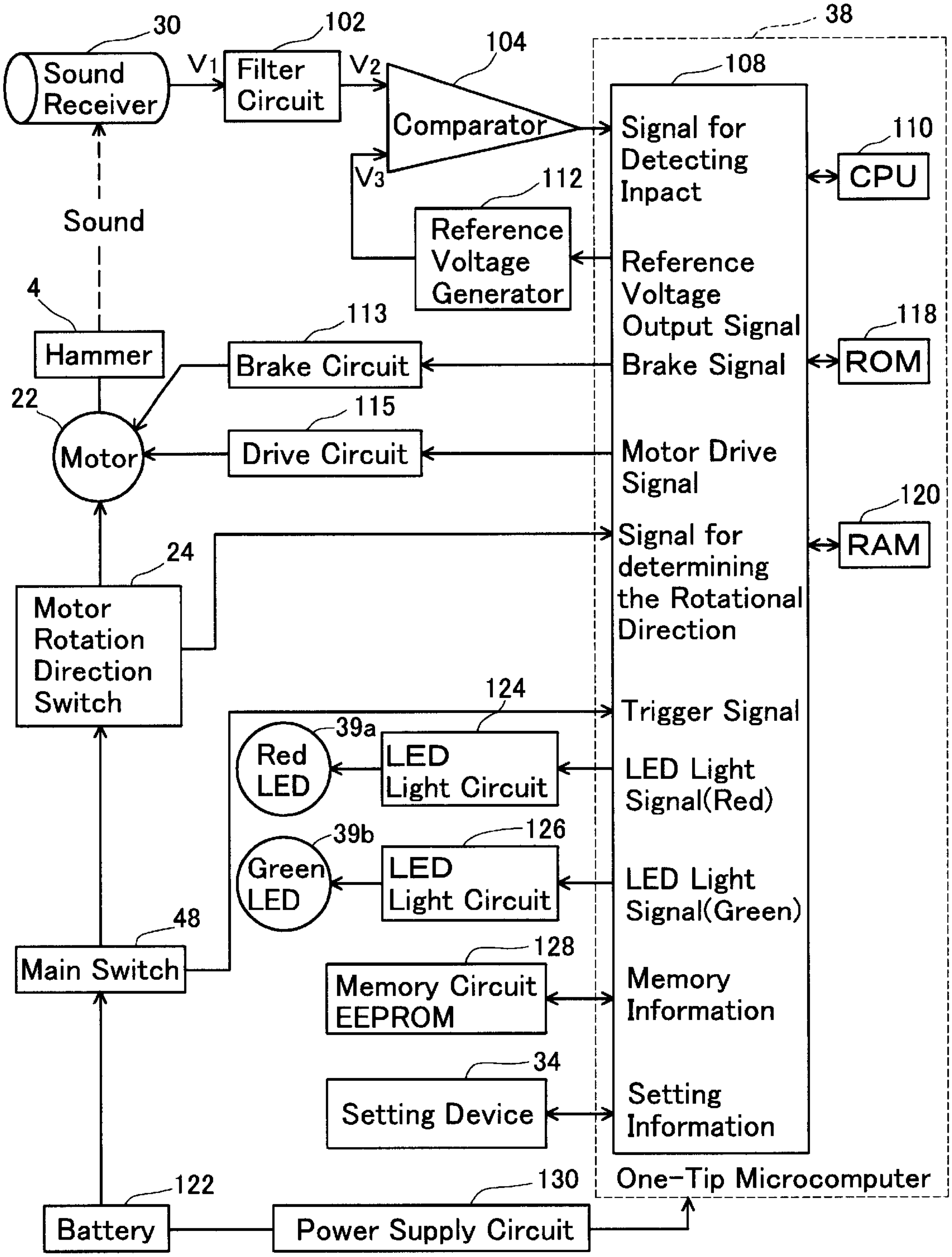
FIG. 4 is a block diagram showing a representative circuit for the representative embodiment.

A representative control circuit (control device), for operating impact wrench 1 is shown in FIG. 4. Generally speaking, the control circuit includes sound receiver 30 and microcomputer 38 mounted on control substrate 36. Microcomputer 38 may preferably include, e.g., central processing unit (CPU) 110, read only memory (ROM) 118, random access memory (RAM) 120 and input/output port (I/O) 108, all of which may be connected as shown in FIG. 4 and may be, e.g., integrated onto a single chip. ROM 118 may preferably store one or more control programs for operating impact wrench 1.

Sound receiver 30 is preferably coupled via filter 102 to one terminal of comparator 104. Voltage V3 from reference voltage generator 112 is input to the other terminal of comparator 104. The output voltage from comparator 104 is coupled to microcomputer 38. The output voltage preferably represents impacts (i.e., between hammer 4 and anvil 2) detected by sound receiver 30.

Battery pack 122 is coupled to microcomputer 38 via power supply circuit 130 and is further coupled to motor 22 via main switch 48 and motor rotation direction switch 24. Motor 22 is coupled to microcomputer 38 via drive circuit 116 and brake circuit 114. Red LED 40 and green LED 41 are also connected to microcomputer 38 via light circuits 124 and 126. Microcomputer 38 is also coupled to setting device 34, which includes dials 33 and 35. Furthermore, memory circuit 128 is coupled to microcomputer 38

When sound receiver 30 detects an impact sound, sound receiver 30 may generate a signal V1. Low frequency noise is filtered from the signal V1 by filter 102 and signal V2 is coupled to comparator 104. If signal V2 is greater than reference voltage V3, comparator 104 will change its output state, thereby generating a pulse wave. The pulse wave output from comparator 104 is coupled to microcomputer 38. Thereafter, microcomputer 38 preferably recognizes the pulse wave as a detected impact between hammer 4 and anvil 2. The use of the detected impact in the operation of impact wrench 1 will be further described below.

Figure 5:
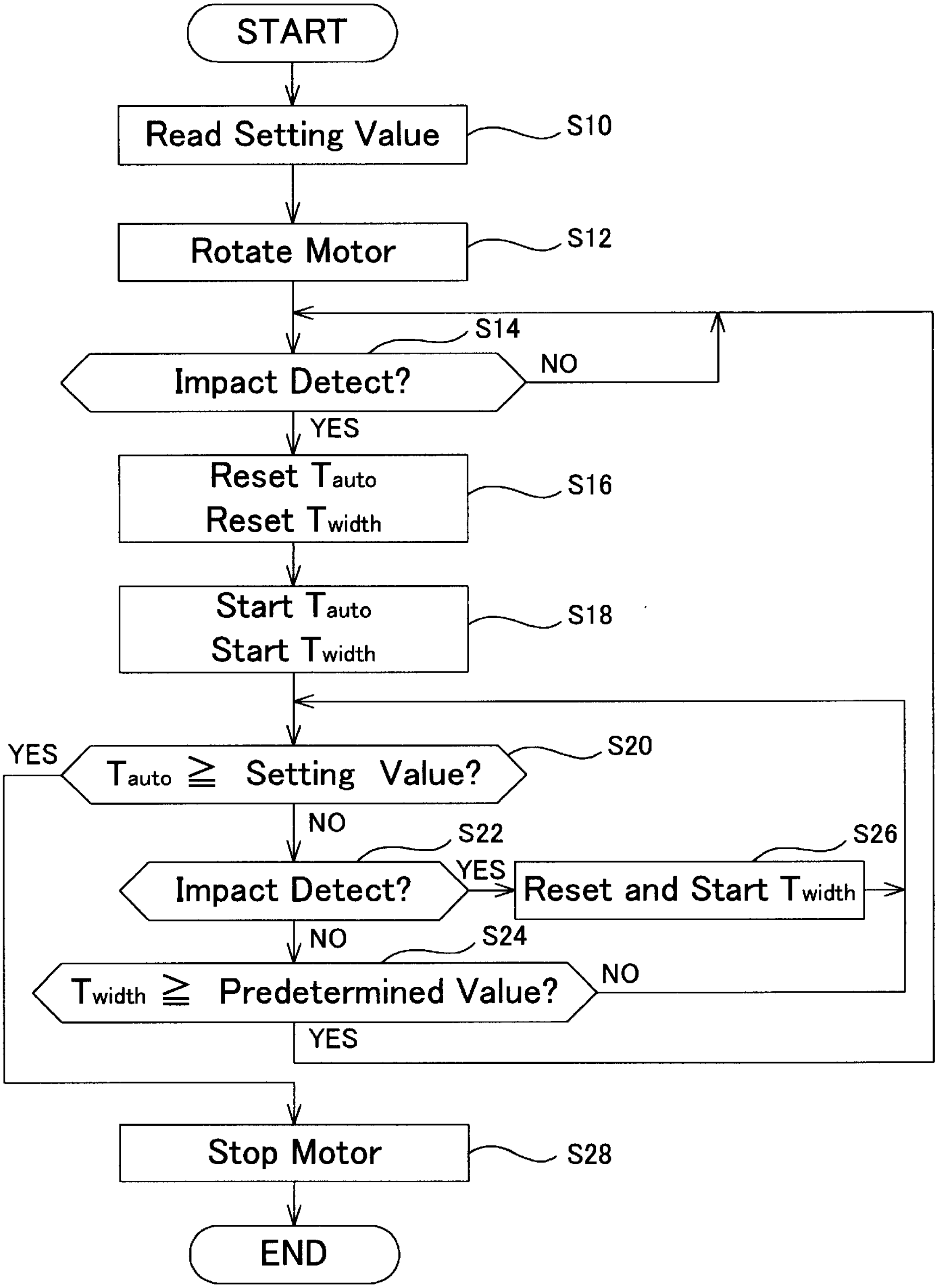
FIG. 5 shows a flowchart that explains the operation of the automatic stop mode.
Figure 6:
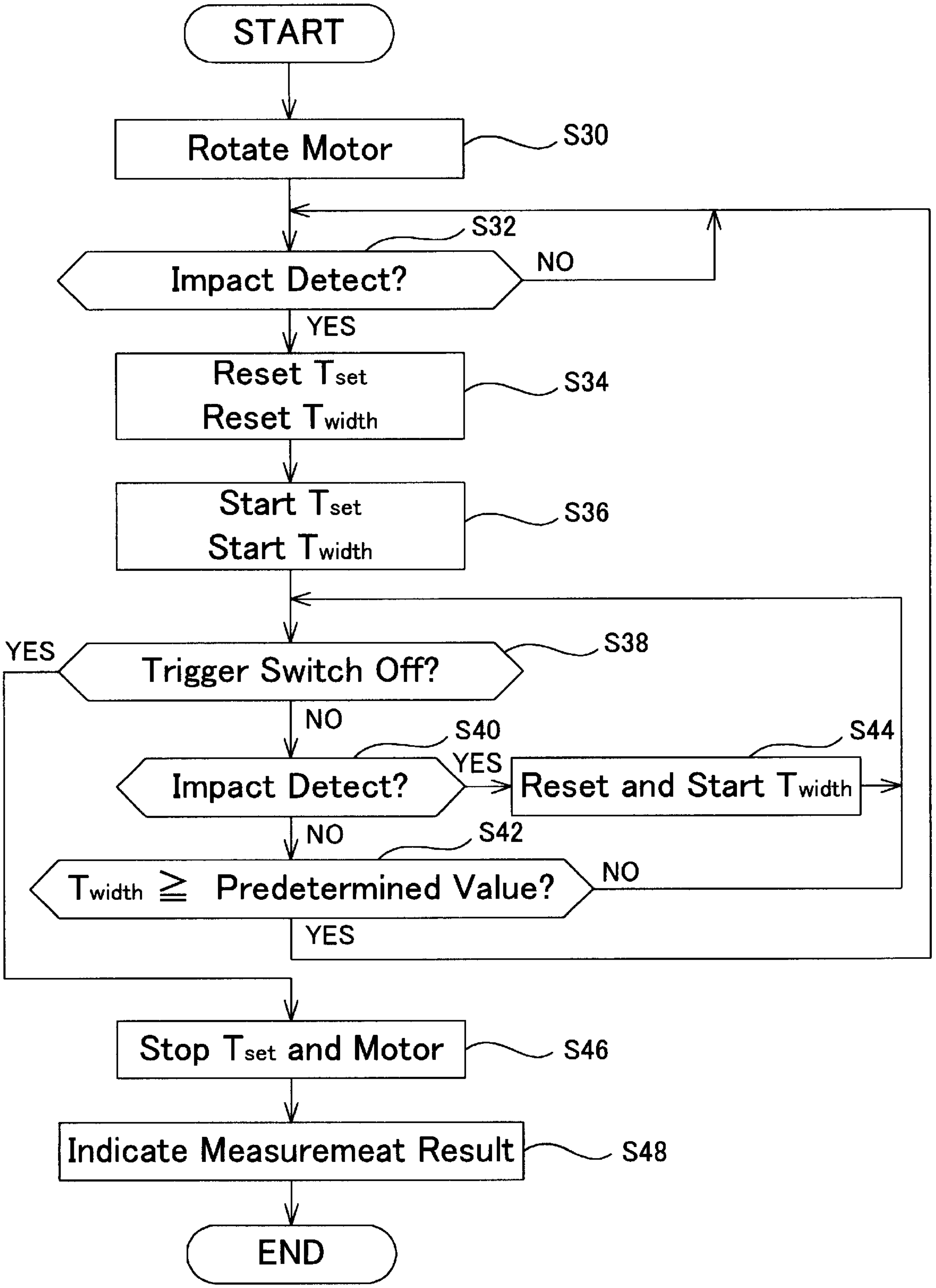
FIG. 6 shows a flowchart that explains the operation of the measurement mode.

Representative processes performed by microcomputer 38 in order to tighten a fastening device (nut or the like) using impact wrench 1 will now be discussed with reference to FIGS. 5 and 6. FIG. 5 shows the flowchart of the process executed in the automatic stop mode, whereas FIG. 6 shows the flowchart of the process executed in the measurement mode.

In the present representative embodiment, as noted above, if numerical values other than “0” are set on first setting dial 33 and second setting dial 35, the automatic stop mode will be activated. If numerical value “0” is set on both dials 33 and 35, the measurement mode will be activated. First, the process executed in the automatic stop mode will be explained below with reference to FIG. 5.

(1) Automatic Stop Mode

For example, when trigger switch 48 is switched to the ON position, microcomputer 38 may first read the setting values (i.e., numerical values “xy”) currently set on setting device 38 (step S10). Specifically, the drive time (the time period from detecting an impact of hammer 4 on anvil 2 to stopping motor 22) is calculated utilizing the numerical value “x” set on first dial 33 and the numerical value “y” set on second dial 33.

Thereafter, microcomputer 38 outputs a motor drive signal to motor 22 via drive circuit 116 (step S12). As a result, motor 22 will rotate in order to start tightening the fastener. Next, microcomputer 38 determines whether or not hammer 4 has impacted or struck anvil 2 (step S14). For example, microcomputer 38 determines whether or not a pulse wave has been input to I/O 108 from comparator 104.

If an impact of hammer 4 and anvil 2 has not been detected (NO in step S14), step S14 is repeated until an impact of hammer 4 on anvil 2 is detected. That is, microcomputer 38 assumes a standby status with respect to this operation until the first impact between hammer 4 and anvil 2 is detected.

When the first impact between hammer 4 and anvil 2 is detected (YES in step S14), timers $T_{auto}$ and $T_{width}$ are reset in step S16 and then started in step S18. Timer $T_{auto}$ is adapted to measure a time period from detecting an impact to stopping motor 22. Timer $T_{width}$ is adapted to measure a time between impacts.

In step S20, microcomputer 38 determines whether automatic stop timer $T_{auto}$ has exceeded the time period set using dial setting device 34 (i.e., the time calculated by the numerical values “xy” that was read in step S10). If automatic stop timer $T_{auto}$ has exceeded the setting value, (YES in step S20), microcomputer 38 proceeds to step S28 in order to stop motor 22. On the other hand, if automatic stop timer $T_{auto}$ has not exceeded the setting value (NO in step S20), microcomputer 38 determines whether or not a new impact of hammer 4 on anvil 2 has been detected(step S22).

If a new impact of hammer 4 on anvil 2 has been detected (YES in step S22), timer $T_{width}$ is reset and started (step S26). Then, microcomputer 38 returns to Step S20 and starts therefrom. More specifically, if automatic stop timer $T_{auto}$ has not exceeded the setting value and the impact of hammer 4 on anvil 2 has been detected, steps S20, S22, and S26 are repeated and timer $T_{auto}$ continues counting. The set value ($T_{auto}$) in step S20 may be preferably about 1.0 second. The predetermined value ($T_{width}$) in step S24 is preferably much shorter than the set value ($T_{auto}$) (e.g., about 0.1 second).

However, if a new impact of hammer 4 on anvil 2 has not been detected (NO in step S22), microcomputer 38 then determines whether timer $T_{width}$ has exceeded a predetermined value (step S24). That is, the predetermined value is compared to the time measured by timer $T_{width}$ . Generally, speaking, the predetermined value may be several times greater than the time interval between impacts applied after the fastener (nut or the like) has reached the seated position.

As noted above, the predetermined value may be set to 0.1 second, which is about 5 times the average interval (i.e., 0.02 second) between impacts after the fastener has reached the seated position. Therefore, if timer $T_{width}$ has exceeded the predetermined value (e.g., about 0.1 second), because a new impact has not been detected after the predetermined time has elapsed after the first impact was detected (YES in step S24), the impact detected in step S14 is determined to be an impact before the fastener has reached the seated position. Thus, the process will return to step S14 in this case. The predetermined value of step 24, which is compared to the time counted by timer $T_{width}$, can be suitably adjusted according to the specifications (diameter, material, etc.) of the fastener being tightened.

If timer $T_{width}$ has not yet exceeded the predetermined value (NO in step S24), the process returns to step S22.

In summary, when an impact between hammer 4 and anvil 2 is detected, a first timer (e.g., $T_{width}$) is reset to zero and then started. If the next impact is not detected within the predetermined time of step S24, microcomputer 38 determines that the first detected impact occurred before the fastener reached the seated position and the process returns to step S14. Thereafter, when the next impact is detected, both the first and second timers (e.g., $T_{width}$ and $T_{auto}$) are reset and started again. Therefore, motor 22 will not be stopped because the second timer (i.e., $T_{auto}$) has exceeded the set value of step S22.

However, motor 22 is preferably automatically stopped after expiration of the set value (e.g., about 1 second). As noted above, timer $T_{auto}$ is not reset after an impact is detected that is determined to have occurred after the fastener reached the seated position. Thus, if timer $T_{auto}$ is not reset, because repeated impacts are detected that fall within $T_{width}$, the set value will provide sufficient time for the fastener to be tightened to the desired torque. Consequently, motor 22 of impact wrench 1 will be driven for a predetermined time (time set by setting device 34) after the fastener has reached the seated position. If an impact occurs before the fastener has reached the seated position (e.g., due to a burr or other imperfection in the fastener), the second timer (i.e., $T_{auto}$) is reset to zero. Further, such pre-seated position impact is not considered for the purpose of determining the period of time that motor 22 will be driven in order to sufficiently tighten the fastener. Naturally, the set value in step S20 can be changed by the operator or another person (e.g., using setting device 34) in order to change the amount of torque applied to the fastener.

(2) Measurement Mode

The measurement mode as well as the automatic stop mode utilizes timer $T_{width}$ for measuring a time interval between impacts. However, whereas the automatic stop mode utilizes timer $T_{auto}$ for automatically stopping motor 22, the measurement mode utilizes timer $T_{set}$ for measuring a drive time. In the measurement mode, as long as main switch 48 is kept in the ON position, motor 22 is continuously driven. Also, timer $T_{set}$ for measuring a drive time measures a time period from when hammer 4 first impacts or strikes anvil 2 to when trigger switch 48 is switched to the OFF position. The process or program performed by microcomputer 38 will be described below with reference to FIG. 6.

When main switch 48 is switched to the ON position, microcomputer 38 outputs a motor drive signal to motor 22 via a drive circuit 116 (step S30). As a result, motor 22 will start rotating and a fastener (bolt or the like) will begin to be tightened in the workpiece. In step S30, microcomputer 38 drives motor 22 and, at the same time, turns on green LED 41 (red LED 40 remains off).

Subsequently, microcomputer 38 determines whether an impact of hammer 4 on anvil 2 has been detected. (Step S32). If an impact of hammer 4 on anvil 2 is not detected (NO in step S32), step 32 is repeated until an impact of hammer 4 on anvil 2 is detected.

However, if the impact of hammer 4 on anvil 2 is detected (YES in step S32), timer $T_{set}$ and timer $T_{width}$ are both reset (step S34) and then started (step S36). Microcomputer 38 starts timer $T_{set}$ and timer $T_{width}$ and, also turns off green LED 41 and turns on red LED 40. Herein, green LED 41 being on, indicates to an operator that an impact (i.e., an impact after the fastener has reached a seated position) has not been detected. Red LED 40 being on, indicates to the operator that the impact has been detected (i.e., both timer $T_{set}$ and timer $T_{width}$ have been started).

In step 38, microcomputer 38 determines whether main switch 48 has been switched to the OFF position. If main switch 48 has not been switched to the OFF position, (NO in step S38), microcomputer 38 determines whether a new impact of hammer 4 on anvil 2 has been detected, i.e., whether a pulse wave has been input to I/O 108 from comparator 104, (step S40).

If a new impact of hammer 4 on anvil 2 has been detected (YES in step S40), timer $T_{width}$ for counting a time interval between impacts is reset and restarted (step S44), and the process from step S38 is repeated. Specifically, if the impact of hammer 4 on anvil 2 has been detected, process steps S38, S40 and S44 are repeated and the timer $T_{set}$ for measuring a drive time continues measuring.

On the other hand, if a new impact of hammer 4 on anvil 2 has not been detected (NO in step S40), microcomputer 38 determines whether timer $T_{width}$ has exceeded a predetermined value (step S42).

If timer $T_{width}$ has exceeded the predetermined value (YES in step S42), the process returns to step S32 and restarts therefrom. That is, if microcomputer 38 determines that the previous impact occurred before the fastener reached the seated position, timer $T_{set}$ is reset. In addition, when the process returns to step S32, microcomputer 38 turns off red LED 40 and turns on green LED 41, whereby the operator can be aware that the timer $T_{set}$ has been reset.

If the timer $T_{width}$ has not exceeded the predetermined value, (NO in step S42), on the other hand, the process returns to step S38 and restarts therefrom. Accordingly, the timer $T_{set}$ is not reset and red LED 40 remains ON (green LED 41 remains OFF).

However, if the determination is YES in step S38 (i.e., if main switch 48 has been switched to the OFF position), the flow proceeds to step S46 in order to turn off motor 22 as well as the timer $T_{set}$. As a result, timer $T_{set}$ will measure the period from when the first impact has been detected after the fastener has reached the seated position to when main switch 48 has been switched to the OFF position.

In step S48, the time measured by timer $T_{set}$ is indicated by red LED 40 and green LED 41. Specifically, the time measured by timer $T_{set}$ is converted to a setting value (i.e., the numerical value that can be set on dial setting device 34). The setting value is indicated by the number of times that green LED 41 and red LED 40 flash. The number of times that green LED 41 flashes represents a digit in the tens and, the number of times that red LED 40 flashes represents a digit in the ones. For instance, if the measured time is 0.28 second, the setting value will be 14 (0.28 sec÷0.02 sec=14); and green LED 41 flashes one time and then red LED 40 flashes four times in succession. The series of flashes of red LED 40 and green LED 41, which represents the setting value, is repeated three times.

If main switch 48 is switched to the OFF position before an impact is detected, red LED 40 and green LED 41 repeatedly flash together in order to indicate to the operator that the drive time was not measured by the timer $T_{set}$.

In summary, the drive time from when the first impact of hammer 4 on anvil 2 is detected after the fastener has reached the seated position to when trigger switch 48 is turned off is measured by the timer $T_{set}$, and the result of the measurement is indicated by flashes in window 39. Accordingly, for example, a skilled operator performing the tightening operation in the measurement mode can know the drive time required to reproduce the same result. Because the drive time indicated to the operator is converted to a number that can be set on dial setting device 34, the operator can readily know what numerical value should be set on dial setting device 34 as a setting value.

Further, red LED 40 and green LED 41 indicates to the operator whether or not the drive time has been measured by the timer $T_{set}$. Accordingly, the drive time is prevented from being measured improperly and being utilized as a setting value.

While a preferred embodiment of the present teaching has been described, such description is for illustrative purposes only. It is to be understood by those skilled in art, that changes and variations may be made.

For example, the above illustrated representative embodiment provides an example of the application of the present teachings to a power tool. However, the present teachings can also be applied to other power tools in which the motor stops running when the total number of impacts of hammer on anvil is counted and equal to a predetermined setting value. In this case, it is preferable that the impacts of hammer on anvil be counted in the measurement mode and the result of the total number be indicated.

Although the power tool according to the above representative embodiment generates an impact by hammer 4 striking anvil 2, the present teachings can also be applied to other impact power tools, such as soft-impact screwdrivers, which generate an impact by an oil unit.

Additionally, in the above described representative embodiment, the measurement result is indicated using the two LEDs. However, other various known displays (e.g., 7-segment display) can also be utilized in order to display the measurement result.

Further, in the above described embodiment, the stopping condition for motor 22 is set by dial setting device 34. However, the stopping condition may be set using a remote control device and a means of communication (e.g., wire or radio). For example, the stopping condition (setting value), for the motor may be set by a remote control device and then communicated to the power tool. The power tool may store the received setting value in a storage circuit in order to read and use the setting value when the motor is in the automatic stop mode.

In order to store the setting value in the above described manner, the stored setting value may directly be replaced by the measurement value obtained in the measurement mode. In this case, the process preferably includes, e.g., a step in which the operator inputs the new setting value in order that the operator may be aware of the replacement of the setting value.

Further, microcomputer 38 may preferably control the speed of rotation of motor 22 according to the amount that main switch 48 has been pulled. If the time period is measured when the amount that main switch 48 has been pulled is insufficient, both red LED 40 and green LED 41 may repeatedly flash together in order to indicate that the drive time should not be used as a setting time.

Finally, although the preferred representative embodiment has been described in detail, the present embodiment is for illustrative purpose only and not restrictive. It is to be understood that various changes and modifications may be made without departing from the spirit or scope of the appended claims. In addition, the additional features and aspects disclosed herein also may be utilized singularly or in combination with the above-described aspects and features.

What is claimed is:

1. A power tool adapted to tighten a fastener, comprising;

a motor, means for generating an elevated torque coupled to the motor, a trigger switch for energizing the motor, a sensor detecting when the means for generating an elevated torque has begun to operate and generate the elevated torque and a microprocessor in communication with the sensor, the trigger switch and the motor, wherein the microprocessor controls the motor according to either (1) a measurement mode, in which the microprocessor drives the motor while the trigger switch is held in the ON position and measures a time period from when a first impact is detected by the sensor to when the trigger switch is switched to the OFF position or (2) an automatic stop mode, in which the microprocessor drives the motor upon the trigger switch is switched to the ON position, and the microprocessor stops the motor when a predetermined time has elapsed after a first impact was detected by the sensor.

2. A power tool as in claim 1, wherein the means for generating an elevated torque comprises:

an anvil, and a hammer coupled to the motor, the hammer being adapted to strike the anvil to thereby rotate the anvil and generate the elevated torque.

3. A power tool as in claim 1, wherein the means for generating an elevated torque comprises an oil pulse unit.

4. A power tool as in claim 1, further comprising a first means for indicating the time period measured in the measurement mode, the first indicating means being connected to the microprocessor, wherein the microprocessor actuates the first indicating means when the trigger switch is switched from the ON position to the OFF position in the measurement mode.

5. A power tool as in claim 4, further comprising a means for setting a value that is converted to the time period for stopping the motor in the automatic stop mode.

6. A power tool as in claim 5, wherein the first indicating means indicates the measured time period such that the measured time period is converted to a setting value that can be set on the setting means.

7. A power tool as in claim 6, wherein the microprocessor controls the speed of rotation of the motor according to the amount that trigger switch has been pulled.

8. A power tool as in claim 7, further comprising a second means for indicating that the time period measured in the measurement mode is inaccurate, the second indicating means being connected to the microprocessor, wherein the microprocessor actuates the second indicating means if the time period is measured when the amount that trigger switch has been pulled is improper.

9. A power tool as in claim 8, further comprising a means for switching from the automatic stop mode to the measurement mode.

10. A power tool adapted to tighten a fastener, comprising;

a motor, means for generating an elevated torque coupled to the motor, a trigger switch for energizing the motor, a sensor detecting when the means for generating an elevated torque has begun to operate and generate the elevated torque and a microprocessor in communication with the sensor, the trigger switch and the motor, wherein the microprocessor controls the motor according to either (1) a measurement mode, in which the microprocessor drives the motor while the trigger switch is held in the ON position and counts a number of impacts detected by the sensor from when the trigger switch is switched to the ON position to when the trigger switch is switched to the OFF position or (2) an automatic stop mode, in which the microprocessor drives the motor upon the trigger switch is switched to the ON position, and the microprocessor stops the motor when the number of impacts detected by the sensor has reached a preset number.

11. A power tool as in claim 10, further comprising a first means for indicating the number of impacts counted in the measurement mode, the first indicating means being connected to the microprocessor, wherein the microprocessor actuates the first indicating means when the trigger switch is switched from the ON position to the OFF position in the measurement mode.

12. A power tool as in claim 11, further comprising a means for setting a value that is converted to the number of impacts for stopping the motor in the automatic stop mode.

13. A power tool as in claim 12, wherein the first indicating means indicates the counted number of impacts such that the counted number of impacts is converted to a setting value that can be set on the setting means.

14. A power tool adapted to tighten a fastener, comprising;

a motor, means for generating an elevated torque coupled to the motor, a trigger switch for energizing the motor, a sensor detecting when the means for generating an elevated torque has begun to operate and generate the elevated torque, a control device in communication with the sensor, the trigger switch and the motor, wherein the control device drives the motor while the trigger switch is held in the ON position and measures a time period from when a first impacts is detected by the sensor to when the trigger switch is switched to the OFF position and a means for indicating the time period measured by the control device, the indicating means being connected to the control device, wherein the control device actuates the indicating means when the trigger switch is switched from the ON position to the OFF position.

* * * * *